(12) United States Patent
Yount et al.

(10) Patent No.: US 6,931,629 B1
(45) Date of Patent: Aug. 16, 2005

(54) METHOD AND APPARATUS FOR GENERATION OF VALIDATION TESTS

(75) Inventors: Charles R. Yount, El Dorado Hills, CA (US); Melvyn A. Goveas, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,526

(22) Filed: Dec. 30, 1999

(51) Int. Cl.[7] .............................................. G06F 9/44
(52) U.S. Cl. .................... 717/126; 127/131; 714/38
(58) Field of Search ............... 717/124–144; 714/38, 30, 36, 138

(56) References Cited

U.S. PATENT DOCUMENTS

| | | | | |
|---|---|---|---|---|
| 4,729,096 A | * | 3/1988 | Larson | 717/126 |
| 5,475,843 A | * | 12/1995 | Halviatti et al. | 717/124 |
| 5,651,111 A | * | 7/1997 | McKeeman et al. | 714/38 |
| 5,754,860 A | * | 5/1998 | McKeeman et al. | 717/124 |
| 5,799,266 A | * | 8/1998 | Hayes | 702/133 |
| 5,841,947 A | | 11/1998 | Nordin | |
| 5,930,780 A | | 7/1999 | Hughes et al. | |
| 5,946,673 A | | 8/1999 | Francone et al. | |
| 6,031,990 A | * | 2/2000 | Sivakumar et al. | 717/126 |
| 6,098,059 A | | 8/2000 | Nordin | |
| 6,138,112 A | * | 10/2000 | Slutz | 717/126 |
| 6,175,948 B1 | * | 1/2001 | Miller et al. | 716/7 |
| 6,226,716 B1 | * | 5/2001 | Bauman et al. | 711/145 |
| 6,347,388 B1 | * | 2/2002 | Hollander | 714/33 |
| 6,393,594 B1 | * | 5/2002 | Anderson et al. | 714/738 |
| 6,425,118 B1 | * | 7/2002 | Molloy et al. | 717/128 |
| 6,438,722 B1 | * | 8/2002 | Bailey et al. | 714/736 |

* cited by examiner

*Primary Examiner*—Tuan Dam
*Assistant Examiner*—Chuck Kendall
(74) *Attorney, Agent, or Firm*—Blakely, Sokoloff, Taylor & Zafman LLP

(57) ABSTRACT

A computer system and a computer-implemented method for generating test programs that satisfy at least one termination criterion. The computer system includes a hardware unit to transmit data. A processor is coupled to the hardware unit and to a storage device. The storage device has stored therein at least one algorithm and a plurality of routines. When the processor executes a routine(s), data is generated. The routine causes the processor to access an algorithm, generate a test program, and analyze a test program. A computer implemented method is also disclosed for generating test programs.

17 Claims, 6 Drawing Sheets

FIG. 5

METHOD AND APPARATUS FOR GENERATION OF VALIDATION TESTS

BACKGROUND OF THE INVENTION

1. Field of the Invention

The invention relates generally to validation methods and more specifically to computer implemented validation methods that efficiently generate test programs that satisfy a criterion established by a user or by a system designer.

2. Description of Related Art

Validation test programs are a series of inputs that are used to verify the functionality of a device such as a microprocessor. Validation of a device may be performed in numerous ways. For example, the device being tested may be simulated by a computer program. Alternatively, the device itself may be tested.

Validation methods include test-based methods, coverage-based validation methods, and other known methods. A coverage-based method, for example, executes a test program that generates new coverage data that is then manually evaluated in view of existing coverage data to determine whether the desired coverage has been reached. Coverage data may be used to gauge the "goodness" of test programs that are used to find "bugs" in a design of a device such as a processor. Coverage data is data that indicates what elements of a given set of conditions were activated during a dynamic or static evaluation of a device under test.

Determining whether the coverage data generated from a test program has achieved the coverage that is necessary is a very labor intensive process. Additionally, a significant amount of effort to redirect a test generator to create a new test program is required.

SUMMARY OF THE INVENTION

In one embodiment, a computer system and a computer-implemented method are disclosed for generating validation test programs. The computer system comprises a processor coupled to a storage device. The storage device has stored therein at least one routine. When the processor executes at least one routine, data is generated. The routine causes the processor to generate and analyze a test program. The routine also generates at least one subsequent test program to be generated until at least one termination criterion is met.

BRIEF DESCRIPTION OF THE DRAWINGS

The features, aspects, and advantages of the invention will become more thoroughly apparent from the following detailed description, appended claims, and accompanying drawings in which:

FIG. 5 illustrates displays that may be revealed to a use in accordance with an embodiment of the invention.

DETAILED DESCRIPTION OF THE INVENTION

The present invention relates to a method and an apparatus for generating validation test programs that are used to simulate a device by using a computer program before the device has been fabricated or the device itself can be tested. The following detailed description and accompanying drawings are provided for the purpose of describing and illustrating presently preferred embodiments of the invention only and are not intended to limit the scope of the invention.

In one embodiment of the invention, an initial population of test programs is either input or generated. The test program(s) are then stored on the storage device. A test program is then selected for execution. The coverage data generated from the execution of a test program is analyzed to determine whether the desired coverage has been attained. The coverage that is required is typically designated by a user or system designer. Based upon the analysis of the new coverage data, test programs are selected for genetic mutation and/or recombination which is used to create a new test program. This new test program is then executed generating new coverage data to be analyzed. This process is repeated until the required coverage is attained.

Disclosed techniques may be used in various forms of validation, including architectural validation, micro-architectural validation, unit-level validation, external bus validation, etc. More specifically, the techniques used in performing functional validation in digital systems including microprocessors and generating functional test suites for computer program or software systems. Generally, the invention is able to attain the same or higher level of coverage in less time with less human effort compared to traditional methods.

In another embodiment of the invention, new test programs are created by a test generator (TG), by using a genetic operation. A genetic operation includes operations such as a mutation operation, a cross-over operation, or numerous other suitable operations. A mutation involves at least one test program that whenever an operation is used to generate a new test program, data from the population is selected and used in the algorithm. If the designated coverage is not attained (or some other termination criterion or criteria have not been met), the test program is modified by the TG and the process is repeated. Alternatively, an operator using a monitor may input a new test program, thereby injecting "hints" into the operation. A test program is then generated and executed. New coverage data is created and evaluated to determine whether the desired coverage has been attained.

Figure 1:
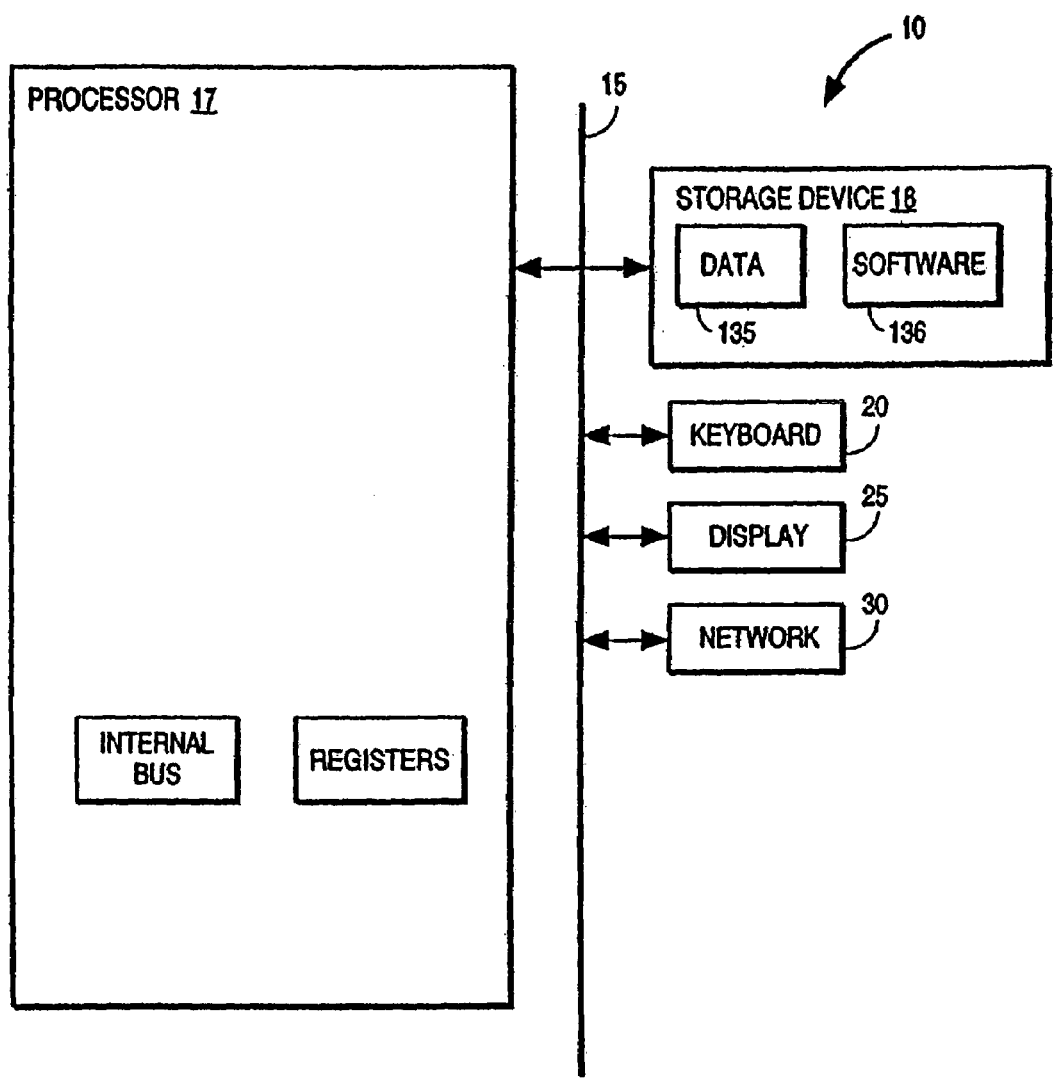
FIG. 1 illustrates an exemplary computer system in accordance with an embodiment of the invention.

FIG. 1 illustrates one embodiment of a computer system 10 which implements the principles of the present invention. Computer system 10 comprises a processor 17, a storage device 18, and a bus 15. Processor 17 is coupled to the storage device 18 by bus 15. In addition, a number of user input/output devices, such as a keyboard 20 and a display 25, are also coupled to the bus 15. Processor 17 represents a central processing unit of any type of architecture (e.g., the Intel architecture, Hewlett Packard architecture, Sun Microsystems architectures, IBM architectures, etc.), or hybrid architecture. In addition, processor 17 could be implemented on one or more chips. Storage device 18 represents one or more mechanisms for storing data such as population data, coverage data, etc. Storage device 18 may include read only memory (ROM), random access memory (RAM), magnetic disk storage mediums, optical storage mediums, flash memory devices, and/or other machine-readable mediums.

Bus 15 represents one or more buses (e.g., AGP, PCI, ISA, X-Bus, VESA, etc.) and bridges (also termed as bus controllers). While this embodiment is described in relation to a single processor computer system, the invention could be implemented in a multi-processor computer system. In addition to other devices, one or more of a network 30 may be present. Network 30 represents one or more network connections for transmitting data over a machine readable media. The invention could also be implemented on multiple computers connected via such a network.

FIG. 1 also illustrates that the storage device 18 has stored therein data 135 and software 136. Data 135 represents data stored in one or more of the formats described herein. Software or computer program 136 represents the necessary code for performing any and/or all of the techniques described with reference to FIGS. 2–6. It will be recognized by one of ordinary skill in the art that the storage device 18 preferably contains additional software (not shown), which is not necessary to understanding the invention.

Figure 2:
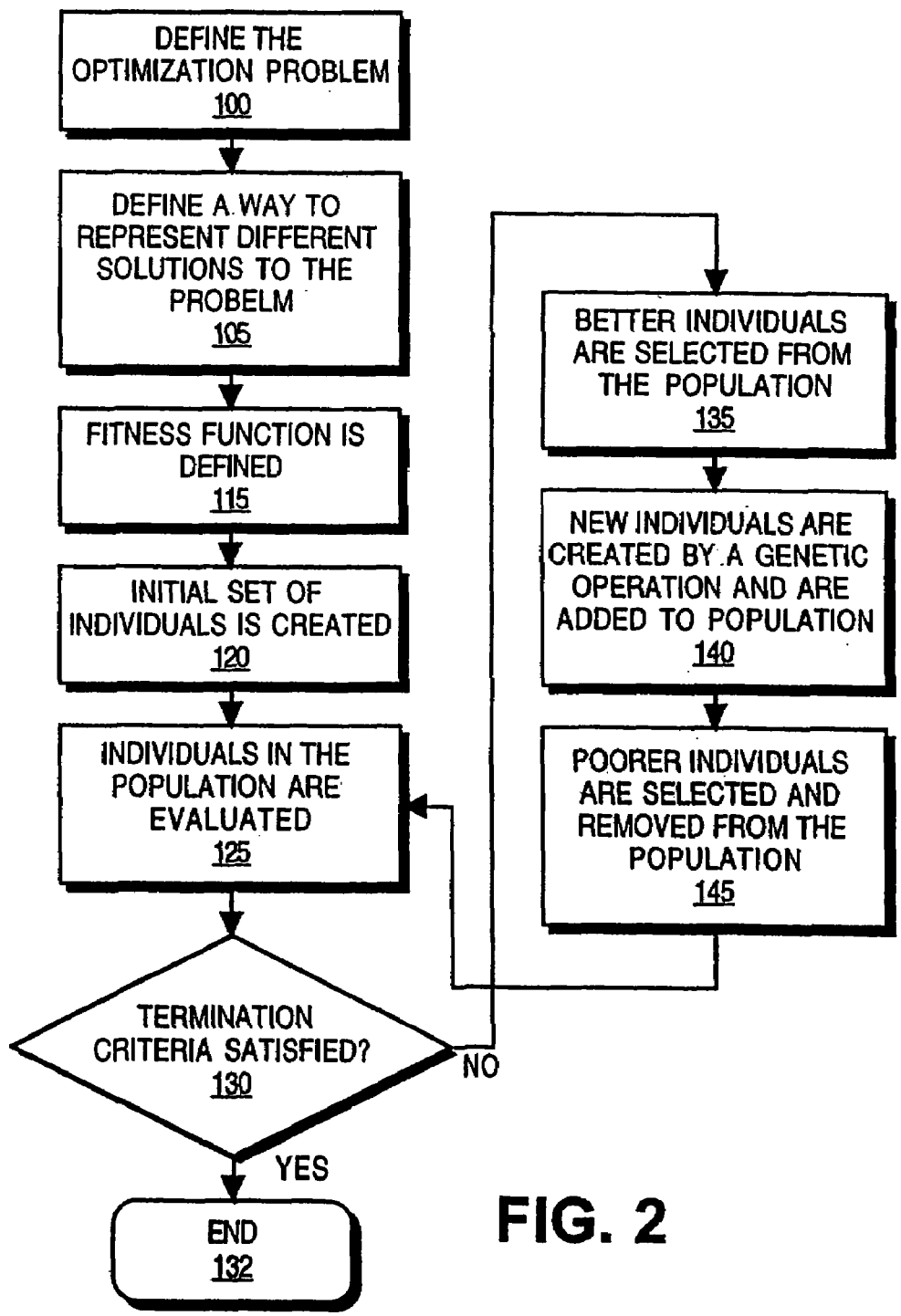
FIG. 2 illustrates a flow chart of an exemplary creation process for an individual test program in a population in an embodiment of the invention.

FIG. 2 provides one example of an application of evolutionary computation involving a representative algorithm. It will be appreciated that numerous examples exist and that the invention is not limited to any one example. At operation 100, an optimization problem is defined by the user. To illustrate, a user may define the optimization problem as generating iA32 (32-bit Intel Architecture) test programs that, when executed, reach many new states in a new microprocessor design.

At operation 105, different solutions to the optimization problem are defined by the system designer or user. Each solution is called an individual. Each individual test program may be encoded as an abstract syntax tree (AST). Each AST encodes the structure and data of an iA32 test program. For example, some nodes in the AST contain the instructions to be executed during the test program.

At operation 115, a fitness function is defined by the user or system designer. The number of different types of fitness functions is unlimited. The fitness function defines the "goodness" of a particular individual. For example, the fitness function of each individual test program may be defined as the number of new states it reaches in the new microprocessor design.

At operation 120, an initial set of individuals is created. This initial set of individuals is referred to as the initial population. For example, an iA32 random test generator is used to create a set of random test programs. Alternatively, the population may start with a set of existing test programs.

At operation 125, the individuals are evaluated in the population according to the fitness function. For each test program, the new microprocessor may be simulated and how many new states that are reached are recorded. This number is referred to as the individual's fitness.

At operation 130, if the termination criterion (or criteria) is satisfied, the process is terminated at 132. For example, if all known states in the new microprocessor have been reached, the process is ended. It will be appreciated that a variety of termination criterion may be input by a user and the claimed invention is not limited by examples provided herein.

At operation 135, some of the better individuals in the population are selected. For example, a user may require that genetic operations be randomly chosen for a mutation or crossover operation. The user may further require that, for example, eight random individuals from the population be selected. From the eight individuals, an individual is chosen that has the highest fitness. (This is known in the art as "tournament" selection.) If a crossover operation is chosen, this process is repeated to select another individual.

At operation 140, new individuals are created by applying one of several genetic operations. These new individuals are then added to the population.

Several genetic operations may be chosen to illustrate this operation. If a mutation operation is selected, some of the iA32 instructions from the selected test program are randomly removed and are replaced with new random instructions. If a crossover operation is selected, some of the iA32 instructions from the first selected test program are randomly removed and are replaced with randomly selected instructions from the second selected test program.

For this newly-created test program, the new microprocessor is simulated and the number of new states that are reached (i.e., its fitness) is recorded. The new test program and its fitness are then placed into the population.

At operation 145, some of the poorer individuals in the population are removed from the population. For example, eight random individuals may be selected from the population. At least one individual that has the lowest fitness among the eight individuals is removed from the population. Operations 125 to 145 are then repeated until the termination criterion or criteria are met.

Figure 3:
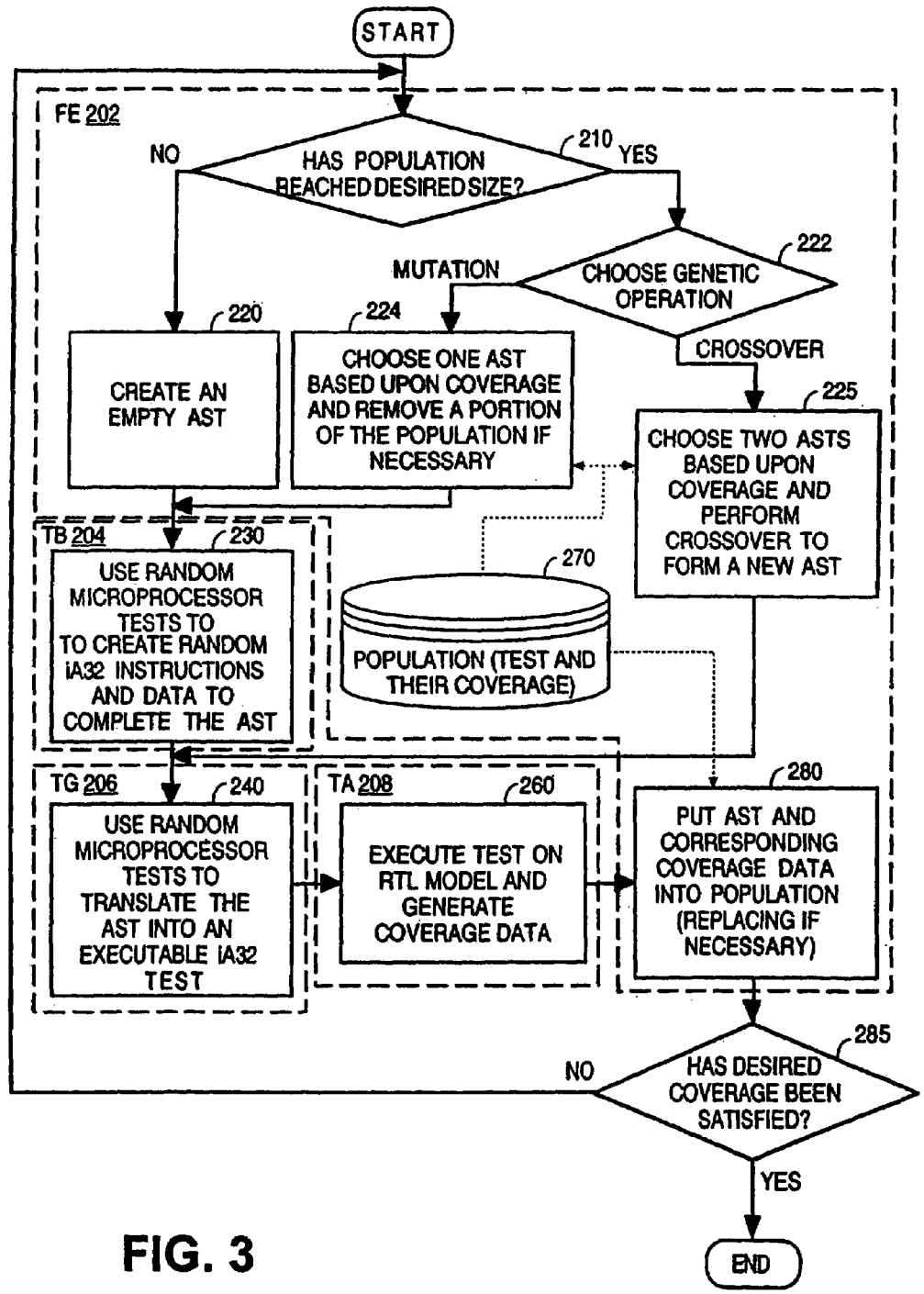
FIG. 3 illustrates an exemplary creation process for each individual test program in a population in an embodiment of the invention.

FIG. 3 shows one embodiment of the invention for generating new test programs using coverage data as a mechanism to guide the generation of each test program. Examples of test generation includes a microprocessor test generator that may generate a sequence of microprocessor instructions and data that will be executed by a model of the microprocessor or an actual microprocessor. Another example includes a unit-level test generator that may generate a sequence of electrical signals that may be fed sequentially to the device under test. The process described below is repeated until a test program is executed which generates coverage data that satisfy the coverage designated by a user or system designer. Although an embodiment of the invention uses coverage data to determine the "goodness" of an individual, it will be appreciated other methods may be used. Data may be processed in series or in parallel when practicing the invention.

FIG. 3 further illustrates one embodiment of the invention in which a computer program comprises four modules or routines—a test builder (TB) 204, a test generator (TG) 206, a test analyzer (TA) 208, and a feedback engine (FE) 202. These modules may run on the same computer system or one or more may run on separate computer systems that may be connected through a network.

One embodiment of the invention relates to generating high-coverage validation test suites having the characteristics of using search techniques that rely upon improvement of evolutionary computation methods and evaluating newly generated coverage data using existing coverage metrics as a feedback mechanism to guide these methods. One search technique navigates through a space of potential solutions by evaluating a subset of those solutions based upon the selection of new test programs and using the evaluation to choose new test programs until the desired coverage is found or a criterion or criteria established by a user or a system designer are met. The search technique uses algorithms. The algorithms that may be used are known and include genetic algorithms, genetic programming algorithms, evolutionary programming algorithms, simulated annealing algorithms, neural-net training algorithms, and other suitable algorithms.

Coverage monitors (not shown) may be used to gather or collect coverage data either during or after executing a test program to allow the new coverage data to be evaluated relative to the existing coverage metrics. Coverage monitors include manually-generated specific-event monitors, silicon-based monitors, automatically-generated coverage monitors, code coverage monitors, or other suitable monitors. Additionally, it will be appreciated that the test program-execution medium can vary from software-based simulation to hardware-accelerated simulation to actual hardware.

The process of evaluating the new coverage data generated from a test program involves comparing the coverage data to the desired coverage designated by a user or system designer. If the desired coverage has not been met, the new coverage data is used as evaluation criterion to guide the process to achieve iterative improvement in order to quickly find the designated coverage. Although there are many types of coverage data, the disclosed techniques use coverage data that is measurable.

FIG. 3 further shows that the FE is used in determining whether the population has reached its maximum size or desired size at operation 210. For example, if the population has not met its actual maximum size at operation 210, an empty abstract syntax tree (AST) is created at operation 220. A random microprocessor test generator is used to create random instructions and data to complete the AST at operation 230. At operation 240, a translator is used to translate the AST into an executable test program.

The executable test program may be executed, for example, on an RTL simulation model wherein reporting data is generated at operation 260. Reporting data relates to coverage of a set of microarchitectural events, sequences of microarchitectural events, or any combination thereof. This operation may run on TA 208.

The AST and the corresponding coverage data are placed into the population 270 at operation 280. The AST and corresponding coverage data may replace a portion of the existing data in the population, if necessary. The necessity of replacing a portion of the data in the population is based upon the maximum or desired size of the population and a replacement algorithm known in the art. The operation is ended at operation 285 provided that the desired coverage has been met. If not, a new generation process for an individual test program in the population is performed looping back to operation 210 followed by the subsequent operations as shown in FIG. 3.

One AST is selected based upon coverage and subjected to a strategy for mutating it 224. Mutation involves changing a test program by replacing a portion of it by a modified or random portion. Thereafter, operations 230, 240, 260, and so on are followed.

It will be appreciated that a variety of methods may be used to determine what genetic operation is used, and the claimed invention is not limited by any example.

One method of selecting a genetic operation indicated to the system may involve a designated percentage of operations, such as 90% of the genetic operations selected must be cross-over. Another method is referred to as adaptive tuning. In this method, the system tracks the genetic operation that provides the most gains in coverage. Each type of genetic operation and its average coverage gain generated are recorded in storage device 18. The genetic operation is then automatically selected that provided the greatest coverage gain. Consequently, the desired coverage may be more quickly achieved by this method of selecting the genetic operation.

The cross-over operation 225 involves combining at least one or more characteristics from at least one individual test program and at least one or more characteristics from at least one other test program. These characteristics are used to form a new AST. Thereafter, operations 240, 260, and so on are followed.

Figure 4:
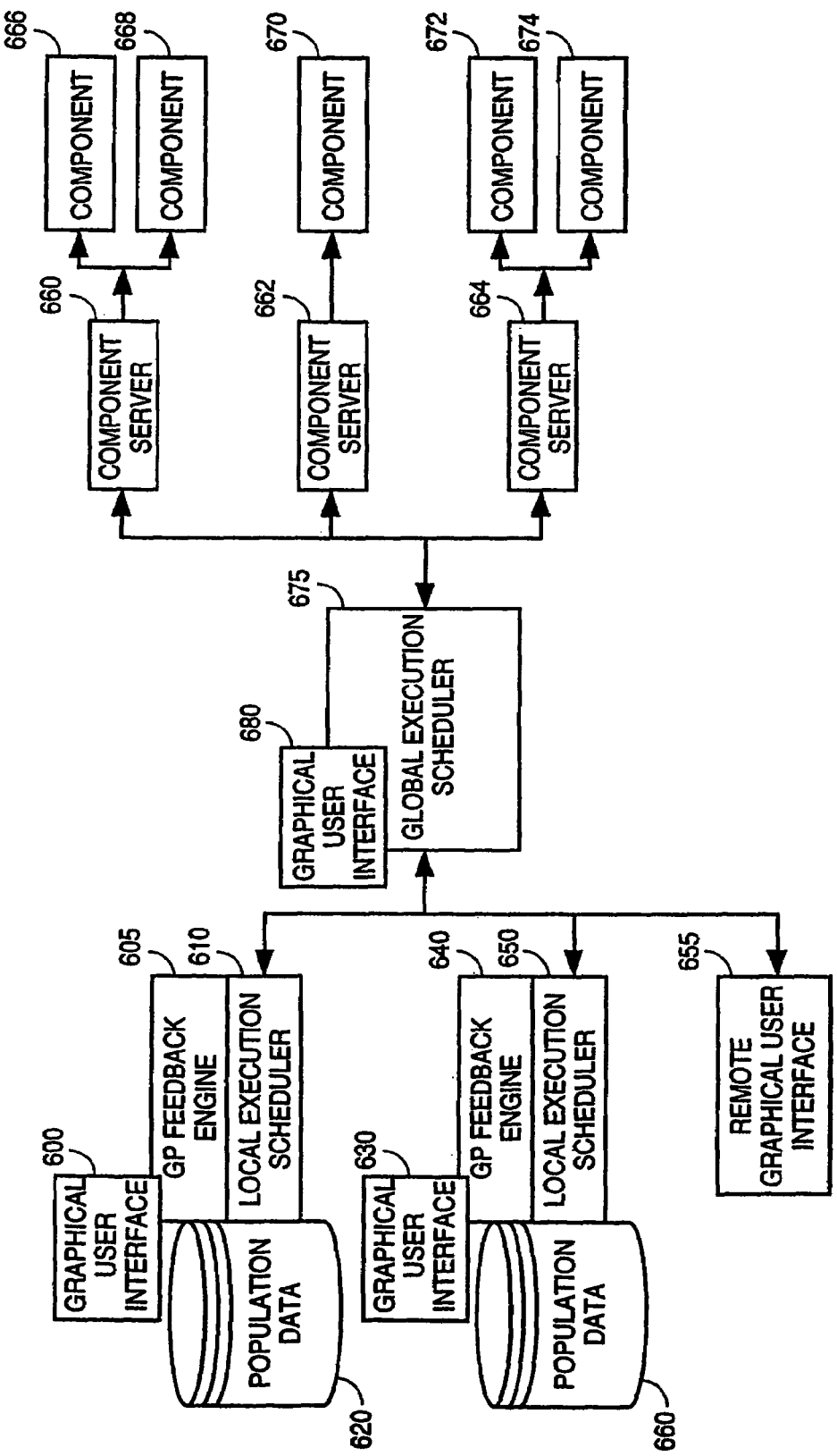
FIG. 4 illustrates a computer system using shared resources in accordance with an embodiment of the invention.

FIG. 4 shows another embodiment of the invention in which a distributed computation framework is shown using shared computer resources. Shared resources reduce the time required to practice the invention. This embodiment of the invention comprises a local execution scheduler (LES), a global execution scheduler (GES), component servers, components and graphical user interfaces. Other configurations also may be used.

1. Local Execution Scheduler (LES)

Each application requires a different sequence of operations to be performed with regard to each test program to find the coverage data for that test program. To perform each operation, the LES requests a component from the GES, uses it, and then releases that component so that another application may use that component. This operation can be performed for one or more test programs. For multiple test programs, the operation may be performed in series or in parallel.

2. Global Execution Scheduler (GES)

The GES is a central process to which all other processes may attach. Resources may be shared by a project group by running one GES. Resources such as components may be shared when two or more applications are attached.

The GES is capable of sending a request to component servers to start components. Once the GES sends a request to the component server to start the components, the components perform application-specific functions such as building or analyzing test programs.

As noted above, FE and LES are part of the computer program. To perform each operation, LES requests a component from the GES. LES uses the component and then releases the component to allow another application to use it. This process is generally performed in series but it can be performed in parallel for multiple test programs.

Figure 5:
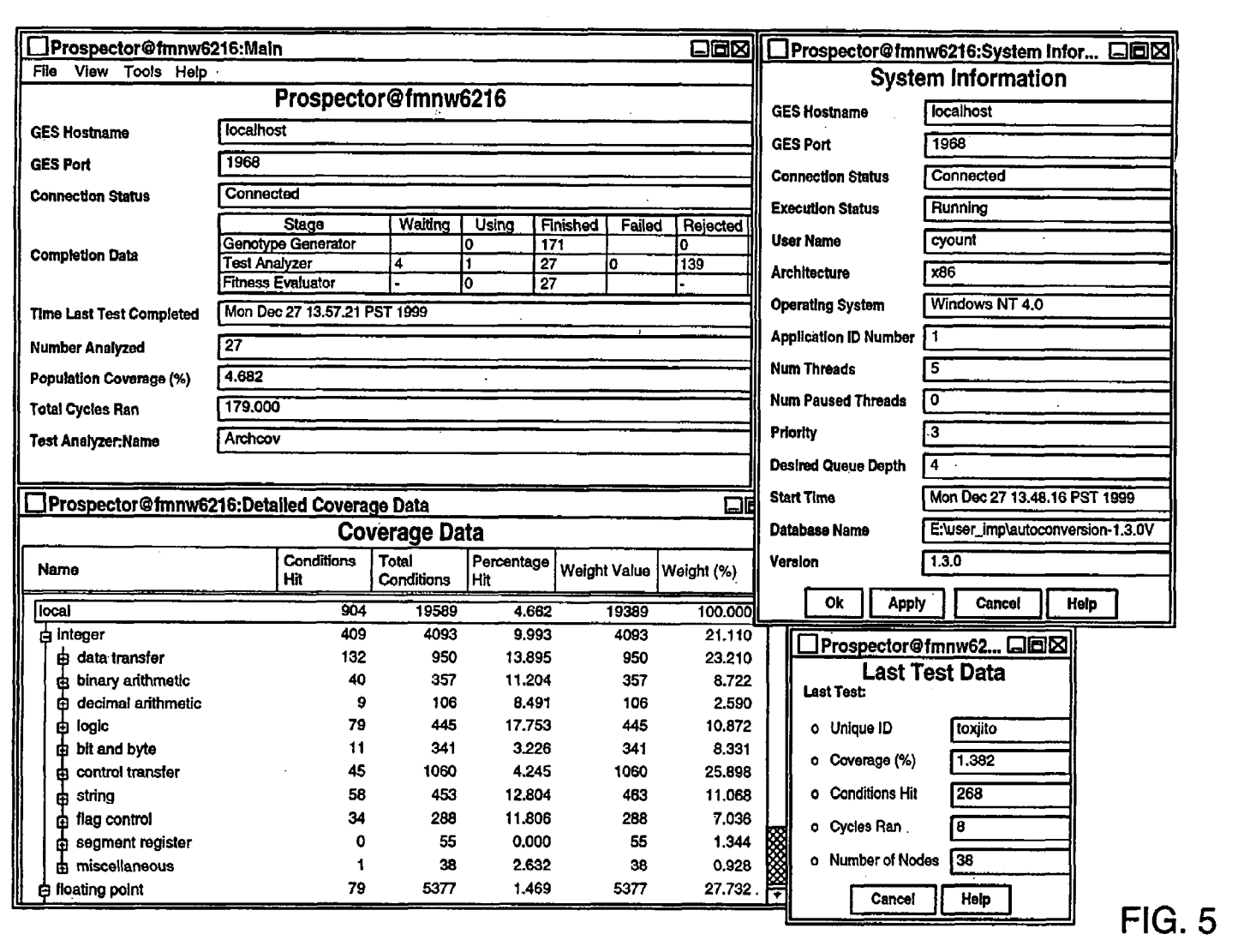

In FIG. 5, the GES performs the function of controlling data flow from the various component servers. For example, component server 660, component server 662, and component server 664 are coupled to GES 675. This allows data to flow to and from these components to GES 675. Coupled to these component servers are a plurality of individual components. For example, component 666 and component 668 are coupled to component server 660. Additionally, component 670 is coupled to component server 662. Component server 672 and component 674 are coupled to component server 664. Component servers start the components when the component servers are requested to do so by the GES.

GES 675 is also coupled to graphical user interface 680 and to FE 605, LES 610, FE 640, LES 650, and a remote GUI 655. A remote GUI may be used to view properties, control applications and the GES for machines other than those upon which these processes were started.

FE 605 and LES 610 form one application program. FE 640 and LES 650 form another application program. Both of these applications are also coupled to a GUI and population data. For example, FE 605 and LES 610 are coupled to GUI 600 and to the population data 620. FE 640 and LES 650 are coupled to GUI 630 and population data 660.

FIG. 5 shows displays that may result on the GUI by running a test program. For example, from these displays, a user can input directions to FE, if necessary.

Figure 6:
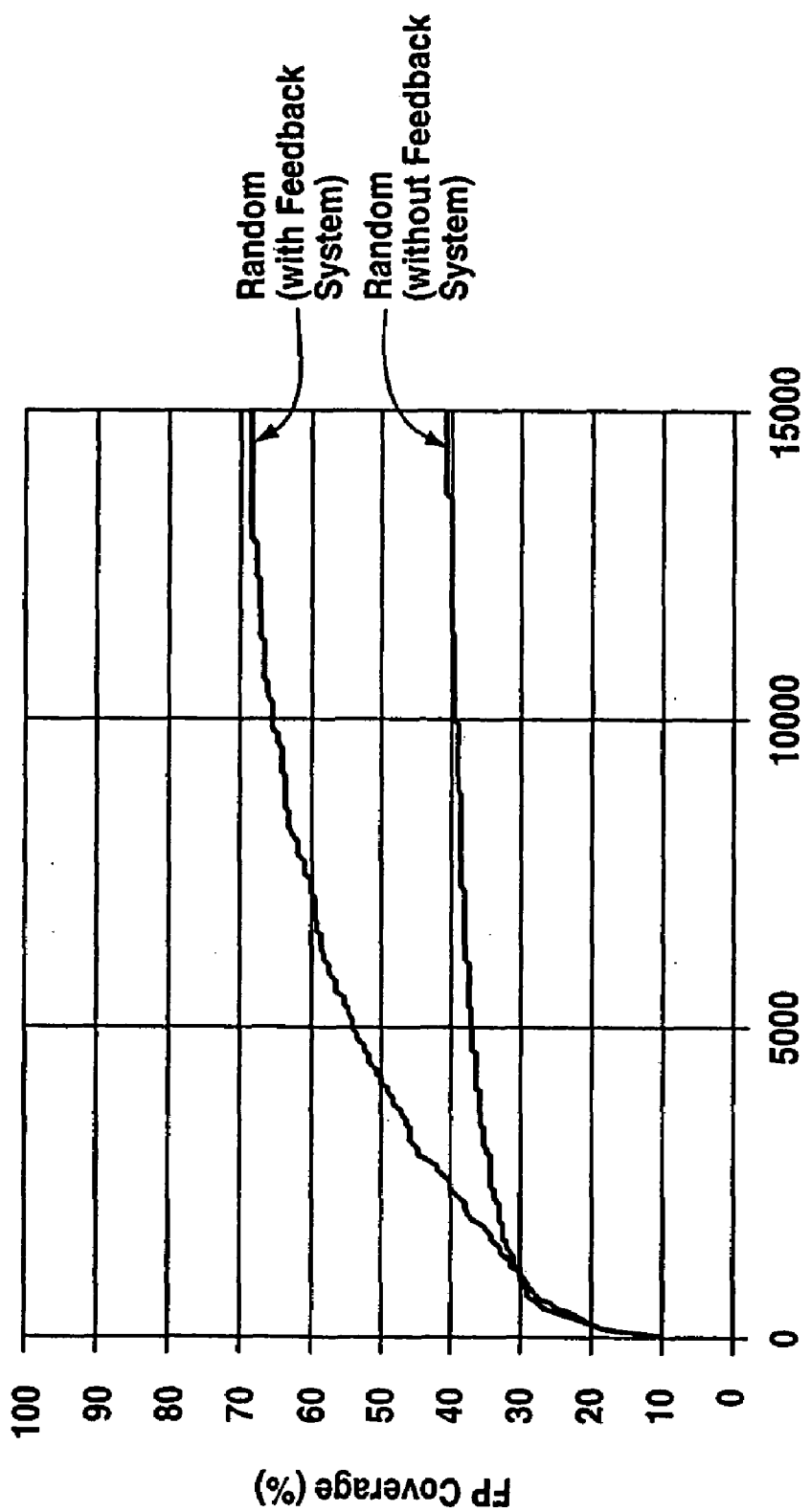
FIG. 6 illustrates results of an embodiment of the invention.

FIG. 6 shows that an embodiment of the invention achieves the coverage that is desired in less time and in less computation cycles than conventional methods. The results for the number of test programs are shown for the floating point coverage percentage for the invention compared to a conventional method. The point of 40.9% coverage was achieved in 15,000 test programs by the control run (no feedback system) compared to only 2,584 required by the invention's feedback system. Thus, the feedback system shows an 83% reduction in the amount of effort required to find this level of coverage. Additionally, running the same number of test programs (15,000) with the invention compared to a conventional method results in achieving 24.7% additional coverage by the invention. Accordingly, the invention improves the chances of finding the desired coverage in a shorter period of time in comparison to conventional methods.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A validation test system comprising:
    a test builder to generate test program populations to test the functionality of an integrated circuit (IC);
    a test generator to translate the test program populations into an executable test;
    a test analyzer to execute the test program populations; and
    a feedback engine to build and update a population of test programs by generating an abstract syntax tree (AST) for each test program populations.

2. The system of claim 1, wherein the feedback engine determines whether a predetermined test program population threshold has been reached after a test program populations has been executed.

3. The system of claim 2, wherein the feedback engine generates one or more mutated ASTs if it is determined that the predetermined test program population threshold has been reached.

4. The system of claim 3, wherein the feedback engine generates a mutated AST by selecting a first AST, removing a segment of the first AST and inserting a replacement segment into the first AST.

5. The system of claim 3, wherein the feedback engine generates a mutated AST by selecting a first AST and a second AST and combining a segment of the first AST with a segment of the second AST.

6. A method comprising:
    generating test program populations at a test builder to test the functionality of an integrated circuit (IC);
    translating the test program populations into an executable test at a test generator;
    executing the test program populations at a test analyzer; and
    generating an abstract syntax tree (AST) for each of the test program populations at a feedback engine.

7. The method of claim 6 wherein generating the AST comprises the feedback engine building and updating a population of test programs.

8. The method of claim 7 further comprising the feedback engine determining whether a predetermined test program population threshold has been reached after a test program populations has been executed.

9. The method of claim 8 further comprising the feedback engine generating one or more mutated ASTs if it is determined that the predetermined test program population threshold has been reached.

10. The method of claim 9 further comprising the feedback engine:
    generating a mutated AST by selecting a first AST;
    removing a segment of the first AST; and
    inserting a replacement segment into the first AST.

11. The method of claim 9 further comprising the feedback engine:
    generating a mutated AST by selecting a first AST and a second AST; and
    combining a segment of the first AST with a segment of the second AST.

12. An article of manufacture including one or more computer readable media that embody a program of instructions, wherein the program of instructions, when executed by a processing unit, causes the processing unit:
    generate test program populations at a test builder to test the functionality of an integrated circuit (IC);
    translate the test program populations into an executable test at a test generator;
    execute the test program populations at a test analyzer; and
    generate an abstract syntax tree (AST) for each of the test program populations at a feedback engine.

13. The article of manufacture of claim 12 wherein the program of instructions, when executed by a processing unit, further causes the feedback engine to generate the AST by building and updating a population of test programs.

14. The article of manufacture of claim 13 wherein the program of instructions, when executed by a processing unit, further causes the feedback engine to determine whether a predetermined test program population threshold has been reached after a test program populations has been executed.

15. The article of manufacture of claim 14 wherein the program of instructions, when executed by a processing unit, further causes the feedback engine to generate one or more mutated ASTs if it is determined that the predetermined test program population threshold has been reached.

16. The article of manufacture of claim 15 wherein the program of instructions, when executed by a processing unit, further causes the feedback engine to:
    generate a mutated AST by selecting a first AST;
    remove a segment of the first AST; and insert a replacement segment into the first AST.

17. The article of manufacture of claim 15 wherein the program of instructions, when executed by a processing unit, further causes the feedback engine to:
    generate a mutated AST by selecting a first AST and a second AST; and
    combine a segment of the first AST with a segment of the second AST.

* * * * *